United States Patent
Koo et al.

(10) Patent No.: US 11,104,007 B2
(45) Date of Patent: Aug. 31, 2021

(54) APPARATUS AND METHOD FOR CONTROLLING ROBOT

(71) Applicant: Research & Business Foundation Sungkyunkwan University, Suwon-si (KR)

(72) Inventors: Ja Choon Koo, Seoul (KR); Kyeong Ha Lee, Seoul (KR); Seung Guk Baek, Suwon-si (KR); Hyun Jin Lee, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 111 days.

(21) Appl. No.: 16/732,524

(22) Filed: Jan. 2, 2020

(65) Prior Publication Data
US 2020/0206943 A1    Jul. 2, 2020

(30) Foreign Application Priority Data
Jan. 2, 2019  (KR) .................. 10-2019-0000447

(51) Int. Cl.
*B25J 19/06* (2006.01)
*B25J 13/08* (2006.01)
*B25J 9/16* (2006.01)

(52) U.S. Cl.
CPC .......... *B25J 13/085* (2013.01); *B25J 9/1638* (2013.01); *B25J 13/087* (2013.01)

(58) Field of Classification Search
CPC ...... B25J 13/085; B25J 13/087; B25J 9/1638; G05B 2219/39338; G05B 2219/39082
USPC ................... 700/245, 258, 264; 73/765
See application file for complete search history.

(56) References Cited

U.S. PATENT DOCUMENTS

| | | | |
|---|---|---|---|
| 9,696,221 B2* | 7/2017 | Lauzier | G01L 5/226 |
| 10,019,566 B1* | 7/2018 | Gallagher | G06F 21/31 |
| 10,166,676 B1* | 1/2019 | Hudson | B25J 13/085 |
| 2012/0059515 A1* | 3/2012 | Abdallah | B25J 9/1633 700/255 |
| 2016/0361125 A1* | 12/2016 | Balicki | B25J 19/06 |

FOREIGN PATENT DOCUMENTS

KR     10-1606543 B1    3/2016

* cited by examiner

*Primary Examiner* — Dalena Tran
(74) *Attorney, Agent, or Firm* — NSIP Law

(57) ABSTRACT

Provided are an apparatus and method for controlling a robot. The apparatus includes an active force detector configured to detect an active force, to which a natural force caused by a physical interaction between a user and a robot and not reflecting an operation intention of the user is applied, applied by the user to the robot operating through the physical interaction with the user, a compensator configured to determine a compensation force for actively compensating for the natural force applied to the active force by using a method of optimizing an internal parameter of a predefined dynamics model, and a controller configured to determine an operation instruction for controlling an operation of the robot from a result obtained by applying the compensation force determined by the compensator to the active force detected by the active force detector and operate the robot.

12 Claims, 4 Drawing Sheets

APPARATUS AND METHOD FOR CONTROLLING ROBOT

CROSS-REFERENCE TO RELATED APPLICATION

This application claims priority to and the benefit of Korean Patent Application No. 2019-0000447, filed on Jan. 2, 2019, the disclosure of which is incorporated herein by reference in its entirety.

BACKGROUND

1. Field of the Invention

The present invention relates to an apparatus and method for controlling a robot, and more particularly, to a robot control apparatus and method for controlling a robot in the field of physical human-robot interaction (pHRi) systems.

2. Discussion of Related Art

With the rapid development of the robot technology, robots which have been mainly used in industrial fields requiring simple and repetitive tasks are recently being developed to actively interact with humans. In particular, pHRi which involves research on collaboration between human and robot through physical interaction is being applied to a wide range of fields such as direct teaching in which a person teaches a robot a specific action in an industrial field and medical rehabilitation which is carried out while a user is equipped with a robot. In these human-robot interaction system fields, robot control involves measuring a force applied to a robot by a user through a force/torque sensor installed in the robot, converting the force into a location, velocity, acceleration, force, torque, or the like to be implemented by the robot, and operating the robot.

Since robot control based on a pHRi system is performed while a user and a robot are physically connected, a force or torque measured through a force/torque sensor installed in a robot unavoidably reflects a force or torque caused by dynamic characteristics of the user's body and a motion of the robot (hereinafter, referred to as a natural force) as well as a force or torque intentionally applied by the user. Also, even while the user just holds the force/torque sensor installed in the robot without intending any operation, a natural force is measured through the force/torque sensor if the robot moves. As a result, control performance over the robot is degraded due to a distorted output signal of the force/torque sensor.

Further, dynamic characteristics of a user vary from person to person, and even a person varies in condition, posture, and the magnitude of applied force in real time according to the time point of robot control. Consequently, to improve robot control performance based on a pHRi system, it is necessary to actively compensate for a natural force which is changed according to dynamic characteristics of a user varying in real time as mentioned above.

A related art of the present invention is disclosed in Unexamined Korean Patent Publication No. 10-2014-0130045 (Nov. 7, 2014).

SUMMARY OF THE INVENTION

The present invention is directed to providing a robot control apparatus and method for ensuring, in robot control based on a physical human-robot interaction (pHRi) system, robot control performance robust to dynamic characteristics of a user's body and a change in operation by actively compensating for a natural force caused and changed in real time due to the dynamic characteristics of the user's body or a motion of a robot.

According to an aspect of the present invention, there is provided an apparatus for controlling a robot, the apparatus including: an active force detector configured to detect an active force, to which a natural force caused by a physical interaction between a user and a robot and not reflecting an operation intention of the user is applied, applied by the user to the robot operating through the physical interaction with the user; a compensator configured to determine a compensation force for actively compensating for the natural force applied to the active force by using a method of optimizing an internal parameter of a predefined dynamics model; and a controller configured to determine an operation instruction for controlling an operation of the robot from a result obtained by applying the compensation force determined by the compensator to the active force detected by the active force detector and operate the robot.

The compensator may update and determine the compensation force by optimizing the internal parameter of the dynamics model so that a value of an objective function dependent on an energy according to the active force applied to the active force detector by the user may be reduced.

The compensator may perform a first process of randomly determining a variation of the internal parameter, a second process of determining a gradient of the objective function by using the value of the objective function, which is calculated on the basis of an operation parameter of the robot in a current cycle and the active force currently detected by the active force detector, and the determined variation of the internal parameter, a third process of optimizing the internal parameter on the basis of the determined gradient of the objective function to reduce the value of the objective function, and a fourth process of updating and determining the compensation force according to the optimized internal parameter.

The compensator may repeatedly perform the first to fourth processes according to a set time period.

The operation parameter may be a travel distance or velocity according to an operation of the robot, and the objective function may depend on a value obtained by dividing the energy according to the active force in the set time period by the travel distance according to the operation of the robot in the set time period.

The compensator may perform the first and second processes using simultaneous perturbation stochastic approximation (SPSA) and perform the third process using AMSGrad.

According to another aspect of the present invention, there is provided a method of controlling a robot, the method including: detecting, by an active force detector, an active force, to which a natural force caused by a physical interaction between a user and a robot and not reflecting an operation intention of the user is applied, applied by the user to the robot operating through the physical interaction with the user; determining, by a compensator, a compensation force for actively compensating for the natural force applied to the active force by using a method of optimizing an internal parameter of a predefined dynamics model; and determining, by a controller, an operation instruction for controlling an operation of the robot from a result obtained by applying the compensation force determined by the compensator to the active force detected by the active force detector and operating the robot.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
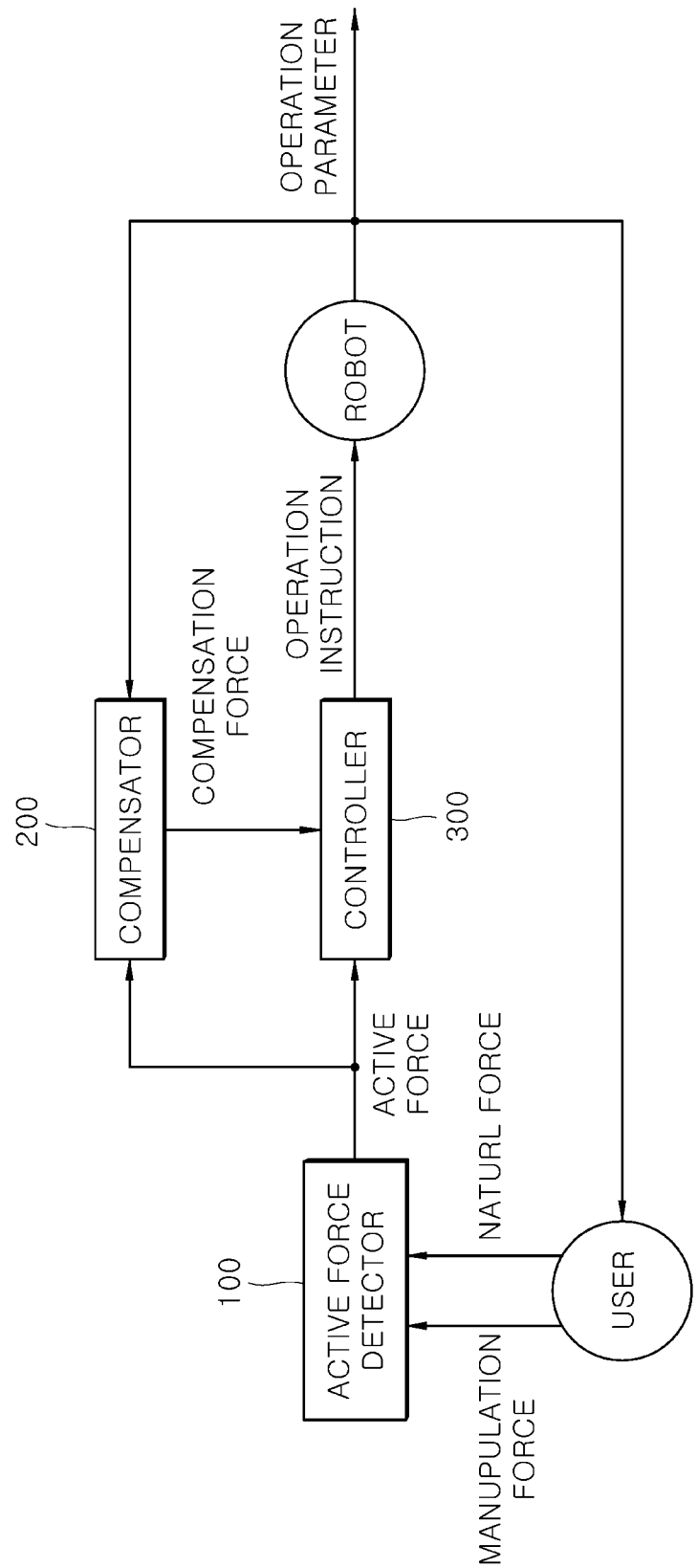
FIG. 1 is a block diagram illustrating an apparatus for controlling a robot according to an exemplary embodiment of the present invention.

Hereinafter, an apparatus and method for controlling a robot according to exemplary embodiments of the present invention will be described with reference to the accompanying drawings. In this process, thicknesses of lines, sizes of elements, and the like shown in the drawings may be exaggerated for clarity and convenience of description. Further, terms used below are defined in consideration of functionality in the present invention and may vary depending on an intention of a user or an operator or a usual practice. Therefore, definitions thereof should be made on the basis of the overall content of this specification.

Figure 2:
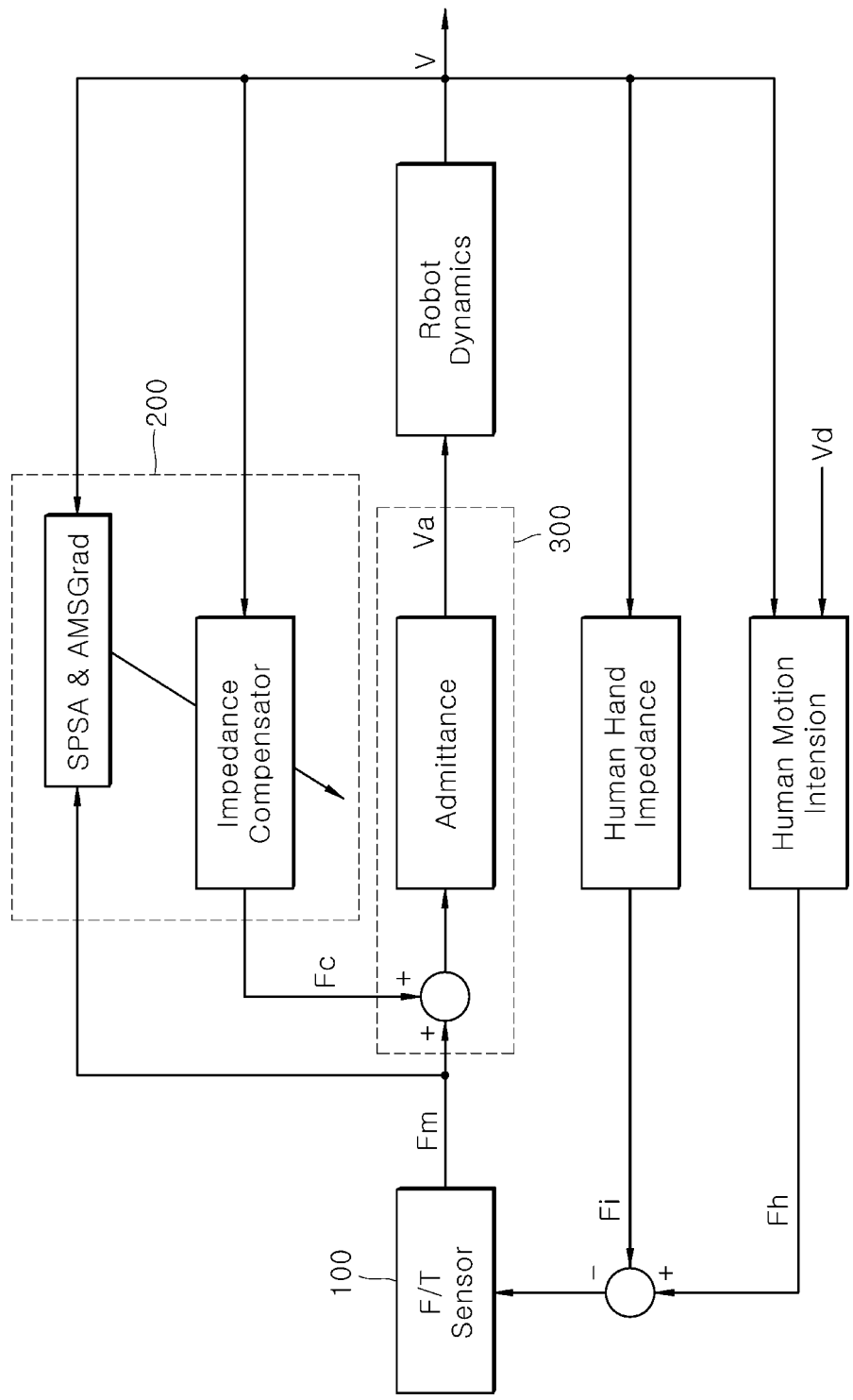
FIG. 2 is a block diagram illustrating in detail a control mechanism of the apparatus for controlling a robot according to an exemplary embodiment of the present invention.

FIG. 1 is a block diagram illustrating an apparatus for controlling a robot according to an exemplary embodiment of the present invention, and FIG. 2 is a block diagram illustrating in detail a control mechanism of the apparatus for controlling a robot according to an exemplary embodiment of the present invention.

Referring to FIG. 1, an apparatus for controlling a robot according to an exemplary embodiment of the present invention may include an active force detector 100, a compensator 200, and a controller 300. The apparatus for controlling a robot according to this exemplary embodiment may be applied to a robot controller which controls a robot on the basis of physical human-robot interaction (pHRi).

The active force detector 100 may detect an active force applied by a user to a robot, which operates through a physical interaction with the user, and transfer the detected active force to the compensator 200 and controller 300 to be described below. As shown in FIG. 2, the active force detector 100 may be implemented as a force/torque sensor and detect a force or torque applied as the active force by a user. The active force detected by the active force detector 100 basically reflects a force or torque to which the user's operation intention for the robot is applied. To distinguish between terms, a force or torque to which a user's operation intention for a robot is applied is referred to as a manipulation force.

Also, the active force unavoidably reflects a force or torque which is necessarily caused by a physical interaction between the user and the robot and does not reflect an operation intention of the user (i.e., a force caused by dynamic characteristics of the user's body and a motion of the robot). To distinguish between terms, a force or torque which is necessarily caused by a physical interaction between a user and a robot and does not reflect an operation intention of the user is referred to as a natural force. The natural force applied to the active force may be compensated for by the compensator 200 to be described below.

The controller 300 may determine an operation instruction for controlling an operation of the robot from the active force detected by the active force detector 100 and operate the robot. To this end, the controller 300 may include an admittance controller as shown in FIG. 2. The robot may operate according to the operation instruction determined by the controller 300 and generate an operation parameter. In this exemplary embodiment, the operation instruction is defined to be a travel distance instruction or a velocity instruction for achieving a travel distance or a velocity of a manipulator or an end-effector of the robot, and the operation parameter of the robot is defined to be a travel distance or a velocity of the manipulator or the end-effector of the robot achieved according to the travel distance instruction or the velocity instruction.

A process in which a user and a robot physically interact with each other on the basis of operations of the active force detector 100 and the controller 300 will be schematically described with reference to FIG. 2. In FIG. 2, an operation instruction and an operation parameter relate to "velocity."

A user recognizes a velocity V as an operation parameter of the robot achieved under the control of the controller 300 and applies a manipulation force $F_h$ for operating the robot at a desired velocity $V_d$ to the robot (the block "Human Motion Intention" of FIG. 2), and the manipulation force is detected by the active force detector 100. At this time, a natural force $F_i$ is caused by dynamic characteristics of the user and a motion of the robot (the block "Human Hand Impedance" of FIG. 2) as described above, and the natural force is also detected by the active force detector 100. In other words, an active force $F_m$ detected by the active force detector 100 reflects the natural force as well as the manipulation force ($F_m = F_h - F_i$). Since the active force is distorted by the natural force, the velocity V of the robot achieved according to a velocity instruction $V_a$, which is converted from the active force through the admittance controller of the controller 300 (the block "Admittance" of FIG. 2), differs from the velocity $V_d$ intended by the user (the block "Robot Dynamics" of FIG. 2).

To solve this problem, this exemplary embodiment employs a structure for compensating for the natural force applied to the active force, and operation of the compensator 200 will be described in detail below with reference to FIGS. 1 and 2.

The compensator 200 may determine a compensation force for actively compensating for the natural force applied to the active force by using a method of optimizing an internal parameter of a predefined dynamics model. In other words, the compensator 200 determines a compensation force through an internal parameter of the dynamics model and compensates for a natural force applied to an active force so that an operation parameter of the robot may be achieved as intended by the user. In this case, considering that the natural force is changed in real time due to dynamic characteristics of the user's body and a motion of the robot, the compensator 200 updates and determines the compensation force by using optimizing the internal parameter of the dynamics model so that the natural force may be actively compensated for. As shown in FIG. 2, the compensator 200 may include an impedance compensator (the block "Impedance Compensator") in which the dynamics model is defined, and the internal parameter of the dynamics model in the impedance compensator may be optimized by simultaneous perturbation stochastic approximation (SPSA) and AMSGrad (the block "SPSA & AMSGrad") to be described below.

As the aforementioned dynamics model, various dynamics models, such as a linear mass-spring-damper system, may be employed. In this exemplary embodiment, the dynamics model is described as a linear mass-spring-damper system. Accordingly, a transfer function C of the impedance compensator may be represented by Equation 1 below.

$$C = \frac{F_c(s)}{V(s)} = \frac{m_c s^2 + c_c s + k_c}{s} \quad \text{[Equation 1]}$$

In Equation 1, $m_c$, $c_c$, and $k_c$ denote a mass parameter, a damping parameter, and a stiffness parameter, respectively. $m_c$, $c_c$, and $k_c$ are internal parameters of this exemplary embodiment (it is self-evident that the internal parameters may be designed differently according to an employed dynamics model).

A linear mass-damper system may be modeled after the admittance controller of FIG. 2, and accordingly, a transfer function A of the admittance controller may be represented by Equation 2 below.

$$A = \frac{V_a(s)}{F(s)} = \frac{1}{m_a s + c_a} \quad \text{[Equation 2]}$$

In Equation 2, $m_a$ and $c_a$ denote a mass parameter and a damping parameter, respectively.

Also, a linear mass-spring-damper system may be modeled after dynamic characteristics of the user's body and a motion of the robot, and accordingly, a transfer function H of a natural force according to the dynamic characteristics of the user's body and a motion of the robot may be represented by Equation 3 below.

$$H = \frac{F_i(s)}{V(s)} = \frac{m_h s^2 + c_h s + k_h}{s} \quad \text{[Equation 3]}$$

In Equation 3, $m_h$, $c_h$, and $k_h$ denote a mass parameter, a damping parameter, and a stiffness parameter, respectively.

When a transfer function of an operation parameter according to an operation instruction is R, a transfer function G of the control system shown in FIG. 2 may be derived from Equations 1 to 3 as shown in Equation 4 below.

$$G = \frac{V(s)}{F_h(s)} = \frac{AR}{1 + ARH - ARC}$$
$$= \frac{s}{(m_a + m_h - m_c)s^2 + (c_a + c_h - c_c)s + (k_h - k_c)} \quad \text{[Equation 4]}$$

As can be seen in Equation 4, a natural force according to the internal parameters $m_h$, $c_h$, and $k_h$ may be compensated for through $m_h$, $c_h$, and $k_h$.

In this case, the natural force is changed in real time due to dynamic characteristics of the user's body and a motion of the robot as described above, and it is necessary to update and determine a compensation force in real time in order to compensate for the natural force which is changed in real time. Accordingly, it is necessary to change and optimize the internal parameters which serve as factors for determining the compensation force. For this reason, this exemplary embodiment employs a structure for actively compensating for the natural force through an objective function which is designed to depend on an energy according to an active force applied to the active force detector 100 by the user (i.e., an energy applied to the active force detector 100 by the user).

Specifically, the compensator 200 may update and determine the compensation force by optimizing the internal parameters of the dynamics model so that a value of the objective function dependent on the energy according to the active force applied to the active force detector 100 by the user may be reduced.

In a general active control technique, a mean square error is used as an objective function, and optimal parameters are calculated so that a value of the objective function is gradually reduced. However, in a pHRi system, an operation parameter required for a robot (i.e., a travel distance or velocity) is determined by a user's senses. Accordingly, there is no reference for deriving an optimal parameter, and thus it is not possible to use a mean square error as the objective function. Consequently, it is necessary to design an appropriate objective function to optimize an internal parameter for actively updating and determining a compensation force. This exemplary embodiment employs an objective function which is designed to depend on an energy according to an active force applied to the active force detector 100 by a user. In other words, with the idea that when a less energy is applied to the active force detector 100 by a user, the robot accurately recognizes an operation intention of the user, and the user may be considered to have performed a desired operation with less power, this exemplary embodiment employs an objective function designed to depend on an energy according to an active force applied to the active force detector 100 by a user.

The objective function may be dependent on a value obtained by dividing an energy according to an active force in a set time period (will be described below) by a travel distance according to an operation of the robot in the set time period (represented as an energy per unit travel distance) and may be designed to be, for example, the square of an energy per unit travel distance. Accordingly, an objective function $J(\theta)$ may be designed according to Equation 5 below.

$$J(\theta) = \left[ \frac{\int_T^{T+\Delta t} |F_m V| dt}{\int_T^{T+\Delta t} |V| dt} \right]^2 \quad \text{[Equation 5]}$$

In Equation 5, $J(\theta)$ denotes an objective function, $\theta$ denotes internal parameters ($m_c$, $c_c$, $k_c$), $\Delta t$ denotes a set time period (e.g., 20 ms), $F_m$ denotes an active force, and V denotes a velocity as an operation parameter of a robot. Accordingly, the objective function $J(\theta)$ is defined to be the square of an energy per unit travel distance when internal parameters are determined as $m_c$, $c_c$, and $k_c$ having specific values. Since reducing the value of the objective function of Equation 5 denotes that the robot does not hinder the operation intention of the user, the compensator 200 may update and determine the compensation force by optimizing the internal parameters of the dynamics model so that the value of the objective function may be reduced. As described below, the compensator 200 may repeatedly perform the process of optimizing internal parameters according to a set time period, and accordingly, optimizing internal parameters is to determine internal parameters of a next cycle.

Specifically, a process in which the compensator 200 updates and determines the compensation force includes a first process of randomly determining the variations of internal parameters and a second process of determining a gradient of the objective function by using the value of the objective function, which is calculated on the basis of an operation parameter of the robot in a current cycle and the active force currently detected by the active force detector 100, and the determined variations of the internal parameters. Such first and second processes may be performed on the basis of SPSA. SPSA refers to a technique of randomly changing all parameters to be stochastically optimized and calculating a gradient through a change in an objective function made by the changes to update the parameters.

In the first process, the variations of the internal parameters are represented in the form of $c_k * \Delta k$ where $c_k$ is a perturbation gain in a $k^{th}$ cycle, and $\Delta k$ is a random number vector randomly selected from between −1 and +1. Therefore, during every set time period, the variation of an internal parameter is randomly determined to be $-c_k$ or $+c_k$ in the first process. Also, $m_c$, $c_c$, and $k_c$ may be set to different constant values for $c_k$.

In the second process, the compensator 200 may determine a value of the objective function in a current cycle and a gradient of the objective function. In other words, the compensator 200 may determine a gradient of the objective function by using the value of the objective function, which is calculated on the basis of an operation parameter of the robot in the current cycle and the active force currently detected by the active force detector 100, and the variations of the internal parameters determined in the first process. The gradient of the objective function may be determined by Equation 6 below.

$$\Delta J(\theta_k) = \frac{J(\theta_k + c_k \Delta_k)}{c_k \Delta_k} \quad \text{[Equation 6]}$$

In Equation 6, $\nabla J(\theta_k)$ denotes a gradient of the objective function in the $k^{th}$ cycle, and $\theta_k$ denotes the internal parameters in the $k^{th}$ cycle.

When the gradient of the objective function is determined through the first and second processes, the compensator 200 may optimize the internal parameters on the basis of the determined gradient of the objective function so that a value of the objective function may be reduced. This is a third process which may be performed on the basis of AMSGrad. AMSGrad refers to an optimization technique which is applied to a deep learning algorithm to rapidly derive optimal values of parameters by using a given gradient. According to AMSGrad, optimal values of the internal parameters may be determined by Equation 7 below.

$$m_{k+1} = \beta_1 m_k + (1 - \beta_1) \nabla J(\theta_k) \quad \text{[Equation 7]}$$
$$v_{k+1} = \beta_2 v_k + (1 - \beta_2)(\nabla J(\theta_k))^2$$
$$\hat{v}_{k+1} = \max(\hat{v}_k, v_{k+1})$$
$$\theta_{k+1} = \theta_k - \frac{\mu}{\sqrt{v_k + \varepsilon}} m_k$$

In Equation 7, $m_k$, $v_k$, and $\hat{v}_k$ denote variables used in AMSGrad, $\mu$ denotes a learning rate, $\beta_1$ and $\beta_2$ denote decay rates, $\nabla J(\theta_k)$ denotes a gradient of the objective function in the $k^{th}$ cycle, and $\theta_k$ denotes the internal parameters in the $k^{th}$ cycle.

When the internal parameters are optimized through the third process (i.e., when internal parameters for a next cycle are determined), the compensator 200 may perform a fourth process of updating and determining a compensation force according to the optimized internal parameters. In other words, it is possible to update the compensation force by applying the optimized internal parameters and an operation parameter of the robot to the transfer function C of Equation 1.

Subsequently, the controller 300 may determine an operation instruction for controlling an operation of the robot from a result obtained by applying the compensation force determined by the compensator 200 to the active force detected by the active force detector 100 and operate the robot. The first to fourth processes performed by the compensator 200 and the operation of the controller 300 may be repeatedly performed according to the set time period ($\nabla t$ of Equation 5, and the above subscript k denotes the notation of a cycle), and the set time period may be set to a very short time (e.g., 20 ms) to assume that the user performs the same operation in a corresponding cycle.

Accordingly, a natural force which is changed in real time is actively compensated for so that robot control performance may be improved.

Figure 3:
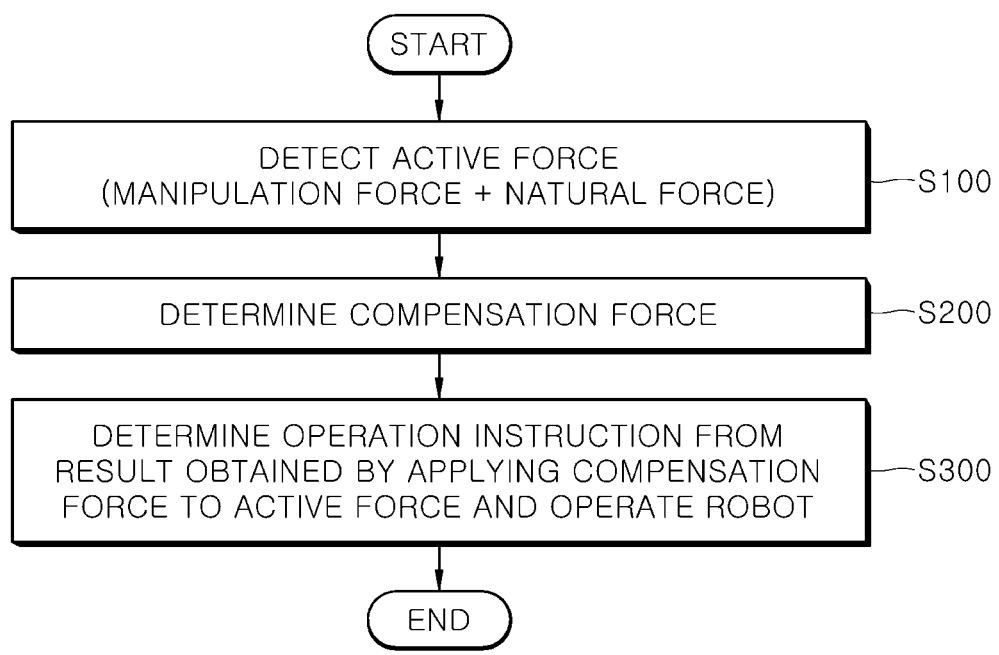
FIG. 3 is a flowchart illustrating a method of controlling a robot according to an exemplary embodiment of the present invention.
Figure 4:
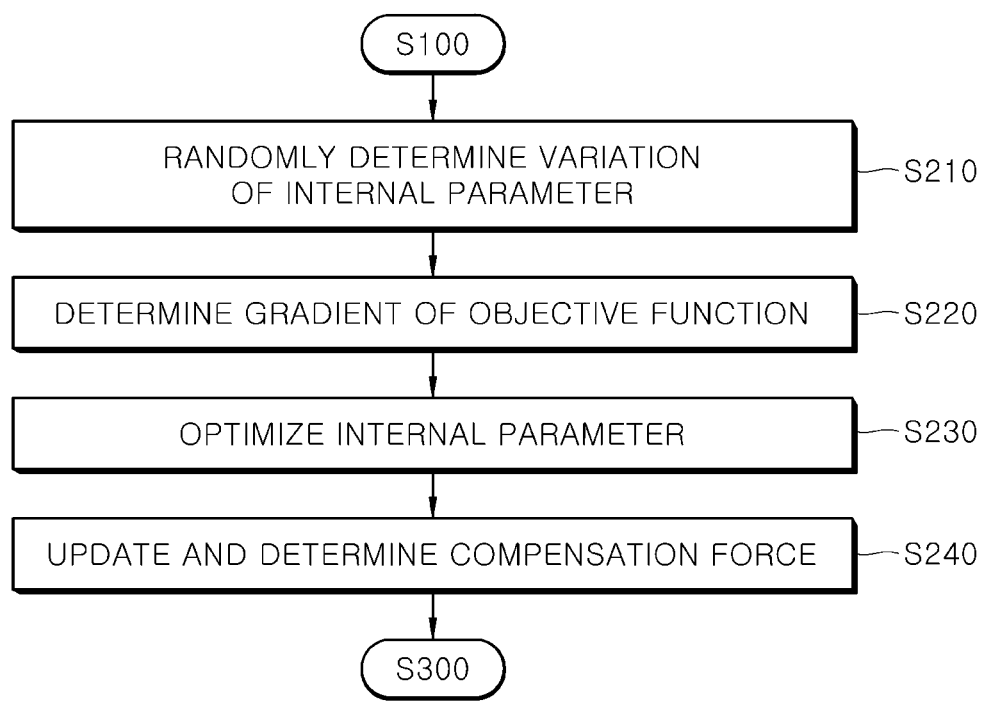
FIG. 4 is a flowchart illustrating in detail an operation of determining a compensation force in the method of controlling a robot according to an exemplary embodiment of the present invention.

FIG. 3 is a flowchart illustrating a method of controlling a robot according to an exemplary embodiment of the present invention, and FIG. 4 is a flowchart illustrating in detail an operation of determining a compensation force in the method of controlling a robot according to an exemplary embodiment of the present invention.

A method of controlling a robot according to an exemplary embodiment of the present invention is described now with reference to FIG. 3. First, the active force detector 100 detects an active force applied by a user to a robot which operates through a physical interaction with the user (S100). As described above, the active force reflects a manipulation force to which an operation intention of the user for the robot is applied and a natural force which is caused by a physical interaction between the user and the robot and does not reflect an operation intention of the user.

Subsequently, the compensator 200 determines a compensation force for actively compensating for the natural force applied to the active force by using a method of optimizing an internal parameter of a predefined dynamics model (S200).

Subsequently, the controller 300 determines an operation instruction for controlling the robot from a result obtained by applying the compensation force determined in operation S200 to the active force detected in operation S100 and operates the robot (S300).

Meanwhile, in operation S200, the compensator 200 may update and determine the compensation force by optimizing the internal parameter of the dynamics model so that an objective function dependent on an energy according to the active force applied by the user to the active force detector 100 may be reduced.

In operation S200, as shown in FIG. 4, the compensator 200 randomly determines a variation of the internal parameter (S210), determines a gradient of the objective function by using a value of the objective function, which is calculated on the basis of an operation parameter of the robot in a current cycle and the active force currently detected by the active force detector 100, and the variation of the internal parameter determined in operation S210 (S220), optimizes the internal parameter on the basis of the gradient of the objective function determined in operation S220 to reduce the value of the objective function (S230), and updates and determines the compensation force according to the optimized internal parameter (S240). Operations S210 to S240 may be repeatedly performed according to a set time period.

Accordingly, in operation S300, the controller 300 determines an operation instruction for controlling an operation of the robot from a result obtained by applying the compensation force periodically transferred from the compensator 200 to the active force detected by the active force detector 100 and operates the robot. In this way, a natural force which is changed in real time is compensated for so that robot control performance may be improved.

As described above, according to this embodiment of the present invention, an internal parameter of a certain dynamics model is optimized to reduce the value of an objective function, which is designed to depend on an energy applied by a user to a force/torque sensor installed in a robot, and a compensation force is updated and determined in real time and applied to robot control. Accordingly, it is possible to actively compensate for a natural force caused and changed in real time due to dynamic characteristics of the user's body or a motion of the robot. Consequently, it is possible to ensure robot control performance robust to dynamic characteristics of the user's body and a change in operation, and a user can control a robot with less strength for the same operation, so that the robot can make a more natural motion.

The description herein may be implemented by, for example, a method, a process, an apparatus, a software program, a data stream, or a signal. Even implementation has been described in a single form (e.g., only described as a method), described features may be implemented in another form (e.g., as an apparatus or a program). An apparatus may be implemented as an appropriate hardware, software, firmware, or the like. A method may be implemented by a device such as a processor which generally refers to a processing device including, for example, a computer, a microprocessor, an integrated circuit, a programmable logic device, and the like. The processor also includes a communication device which facilitates information communication between end users, such as a computer, a cellular phone, a personal digital assistant (PDA), and other devices.

Although exemplary embodiments of the present invention have been described in detail above, the embodiments are merely illustrative, and those of ordinary skill in the art will appreciate that various modifications and equivalents can be made without departing from the scope of the present invention. Therefore, the scope of the present invention should be determined by the following claims and their equivalents.

What is claimed is:

1. An apparatus for controlling a robot, the apparatus comprising:
    an active force detector configured to detect an active force, to which a natural force caused by a physical interaction between a user and a robot and not reflecting an operation intention of the user is applied, applied by the user to the robot operating through the physical interaction with the user;
    a compensator configured to determine a compensation force for actively compensating for the natural force applied to the active force by using a method of optimizing an internal parameter of a predefined dynamics model; and
    a controller configured to determine an operation instruction for controlling an operation of the robot from a result obtained by applying the compensation force determined by the compensator to the active force detected by the active force detector and operate the robot.

2. The apparatus of claim 1, wherein the compensator updates and determines the compensation force by optimizing the internal parameter of the dynamics model so that a value of an objective function dependent on an energy according to the active force applied to the active force detector by the user is reduced.

3. The apparatus of claim 2, wherein the compensator performs:
    a first process of randomly determining a variation of the internal parameter;
    a second process of determining a gradient of the objective function by using the value of the objective function, which is calculated on the basis of an operation parameter of the robot in a current cycle and the active force currently detected by the active force detector, and the determined variation of the internal parameter;
    a third process of optimizing the internal parameter on the basis of the determined gradient of the objective function to reduce the value of the objective function; and
    a fourth process of updating and determining the compensation force according to the optimized internal parameter.

4. The apparatus of claim 3, wherein the compensator repeatedly performs the first to fourth processes according to a set time period.

5. The apparatus of claim 4, wherein the operation parameter is a travel distance or velocity according to an operation of the robot, and
    the objective function depends on a value obtained by dividing the energy according to the active force in the set time period by the travel distance according to the operation of the robot in the set time period.

6. The apparatus of claim 3, wherein the compensator performs the first and second processes using simultaneous perturbation stochastic approximation (SPSA) and performs the third process using AMSGrad.

7. A method of controlling a robot, the method comprising:
    detecting, by an active force detector, an active force, to which a natural force caused by a physical interaction between a user and a robot and not reflecting an operation intention of the user is applied, applied by the user to the robot operating through the physical interaction with the user;
    determining, by a compensator, a compensation force for actively compensating for the natural force applied to the active force by using a method of optimizing an internal parameter of a predefined dynamics model; and
    determining, by a controller, an operation instruction for controlling an operation of the robot from a result obtained by applying the compensation force determined by the compensator to the active force detected by the active force detector and operating the robot.

8. The method of claim 7, wherein the determining of the compensation force comprises updating and determining, by the compensator, the compensation force by optimizing the internal parameter of the dynamics model so that a value of an objective function dependent on an energy according to the active force applied to the active force detector by the user is reduced.

9. The method of claim 8, wherein the determining of the compensation force comprises:

a first operation of randomly determining, by the compensator, a variation of the internal parameter;

a second operation of determining, by the compensator, a gradient of the objective function by using the value of the objective function, which is calculated on the basis of an operation parameter of the robot in a current cycle and the active force currently detected by the active force detector, and the determined variation of the internal parameter;

a third operation of optimizing, by the compensator, the internal parameter on the basis of the determined gradient of the objective function to reduce the value of the objective function; and a fourth operation of updating and determining, by the compensator, the compensation force according to the optimized internal parameter.

10. The method of claim 9, wherein the first to fourth processes are repeatedly performed according to a set time period.

11. The method of claim 10, wherein the operation parameter is a travel distance or velocity according to an operation of the robot, and the objective function depends on a value obtained by dividing the energy according to the active force in the set time period by the travel distance according to the operation of the robot in the set time period.

12. The method of claim 9, wherein the determining of the compensation force comprises performing, by the compensator, the first and second processes using simultaneous perturbation stochastic approximation (SPSA) and performs the third process using AMSGrad.

* * * * *